(12) United States Patent
Jacobs et al.

(10) Patent No.: US 6,354,576 B1
(45) Date of Patent: Mar. 12, 2002

(54) HYBRID PASSIVE AND ACTIVE VIBRATION ISOLATOR ARCHITECTURE

(75) Inventors: Jack H. Jacobs, Glendale; Tristram Tupper Hyde, Phoenix, both of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/426,392

(22) Filed: Oct. 22, 1999

(51) Int. Cl.[7] .................................................. F16F 5/00
(52) U.S. Cl. .................................................. 267/140.14
(58) Field of Search ........................ 267/140.14, 140.15, 267/136, 140.3; 188/378, 379, 380; 248/550, 636, 638, 562

(56) References Cited

U.S. PATENT DOCUMENTS

| | | | |
|---|---|---|---|
| 4,760,996 A | 8/1988 | Davis ........................ | 267/122 |
| 5,052,529 A * | 10/1991 | Sutcliffe et al. ............ | 188/378 |
| 5,219,051 A | 6/1993 | Davis ......................... | 188/378 |
| 5,332,070 A | 7/1994 | Davis et al. ................. | 188/298 |
| 5,333,455 A * | 8/1994 | Yoshioka ................. | 267/140.14 |
| 5,551,650 A * | 9/1996 | Southward et al. .... | 267/140.15 |
| 5,660,255 A * | 8/1997 | Schubert et al. ............ | 188/378 |
| 5,730,429 A * | 3/1998 | Ivers et al. ............ | 267/140.14 |
| 6,022,005 A * | 2/2000 | Gran et al. ................. | 248/550 |

* cited by examiner

Primary Examiner—Christopher P. Schwartz
Assistant Examiner—Thomas J. Williams
(74) Attorney, Agent, or Firm—Charles J. Ungemach; Robert E. Greenstien

(57) ABSTRACT

A vibration isolator which may be constructed in the form of a cube for use in retrofitting a device which is subjected to unwanted vibration present in an attached member which utilizes an active vibration isolator and a passive isolator in series between the members and which may include an overload protection device in the form of a deformable member in parallel with the isolators.

19 Claims, 2 Drawing Sheets

HYBRID PASSIVE AND ACTIVE VIBRATION ISOLATOR ARCHITECTURE

BACKGROUND OF THE INVENTION

1. Field of the Invention

The present invention relates to vibration isolators and more particularly to small easily installed retrofittable modular vibration isolators for active and passive use in a variety of applications such as may be found in satellite payloads for laser cross-link systems, precision pointing systems, submarine decking, launch isolation for precision equipment, E-beam lithography, micro lithography and other optical payloads.

2. Description of the Prior Art

Many passive and active vibration isolation devices exist in the art. Active systems using magneto restrictive or piezoelectric actuators work well for low frequency response, precision pointing and active force cancellation, but are usually more complicated than passive systems. Passive systems work well for solving many high frequency problems but have some material limits. Examples of passive systems include a bellows with fluid in it such as shown in L. P. Davis U.S. Pat. No. 4,760,996 entitled "Damper and Isolation," issued on Aug. 2, 1988, in L. P. Davis U.S. Pat. No. 5,332,070 entitled "Three Parameter Viscous Damper and Isolator," issued on Jul. 26, 1994, and in L. P. Davis U.S. Pat. No. 5,219,051 entitled "Folded Viscous Damper," issued Jun. 15, 1993 (sometimes referred to herein as a "Folded D Strut") all of which are assigned to the assignee of the present invention. These devices perform vibration isolation remarkably well in a variety of applications including those in space. Other isolators such as large rubber materials or shape memory alloys, SMAs, such as nickel titanium based materials, are sometimes used in situations where large shock vibrations are expected such as during satellite launchings. Most of the prior art vibration isolators are designed to be part of the members to be isolated or are installed at least at the time of assembly of the two members. As such, they are specifically designed for the particular parameters to be encountered. The size of the isolator and ease of mounting it are seldom problems, so great latitude has been permitted in the designs.

When dealing with some situations, however, vibration isolation is an afterthought since the desirability of using vibration isolators is not discovered until after the equipment is constructed and assembled and undesirable vibrations are discovered in use. Likewise, particularly in space applications, the space allotted for vibration isolation is extremely limited, and the retrofitting of vibration isolators into an already existing assembly becomes quite difficult.

BRIEF DESCRIPTION OF THE INVENTION

The present invention combines several types of vibration isolators into a single unitary structure to handle a wide variety of conditions and is of small overall dimensions for use in crowded environments and is further capable of being easily mounted in a large number of already existing environments. More particularly, a small, preferably cubic, structure of as little as one inch in each dimension is employed constructed of 1) a passive isolator, preferably a Folded D Strut such as shown in the above mentioned U.S. Pat. No. 5,219,051 of Lawrence P. Davis, 2) an active isolator preferably one employing a piezoelectric actuator with closed loop control, and, if needed, 3) a shock vibration isolator preferably one using a deformable material, or SMA. One end of the active system is connected to the member which may vibrate, and one end of the passive system is connected to the payload to be isolated. The other ends of the active and passive systems are connected to an interstage mass. One corner of the cube contains a threaded mounting hole for attachment to a first of the two members to be isolated and the opposite corner of the cube is mounted on the second of the two members to be isolated. The third shock-type vibration isolator, if used, may be a removable bumper, or preferably, a "shape memory alloy" material, SMA, may also be included in parallel with the other two isolators in the event that a shock, such as by satellite launching, is to be encountered. The advantages of such a system include being sized for retrofitting light to heavy payloads and the ability to be placed directly in the load path of an existing or new payload and tuned to meet the isolation requirements of the system. It may be used in the purely passive mode, in the passive/active mode or in the active mode. When used in the active or passive/active modes, each individual isolator local controller can be linked to another isolator local controller or to a central control system so as to perform global control by receiving feedback signals from each of the local controllers and providing an augmentation signal to adjust the individual responses. In addition, the isolator can provide shock load protection so that it can be used during launch and in orbit.

DETAILED DESCRIPTION OF THE PREFERRED EMBODIMENTS

Figure 1:
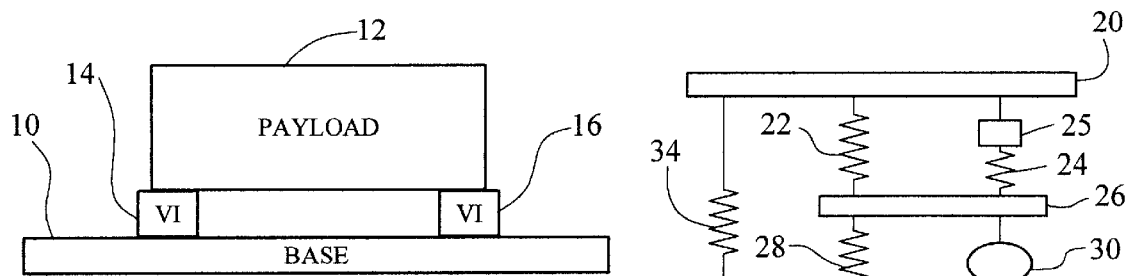
FIG. 1 is a showing of the use of the invention between two members to be isolated.

In FIG. 1, a base 10 which may be a satellite or an arm of a satellite is shown to carry a payload 12 which may be any of a variety of devices such as a camera. Of course, the invention is not limited to space applications and base 10 and payload 12 may be any two members between which there is a desire to reduce or eliminate vibration.

Payload 12 may have been designed to be mounted at three or more corners to base 10 by bolts (not shown) and then later found to need vibration isolation because of some unexpected motions in the base. Because of previous design and assembly of the members, vibration isolation cannot be built into the structure. Accordingly, three or more vibration isolators such as those shown as VI boxes 14 and 16 are placed between base 10 and payload 12 at the three or more mounting points. The number of mounting points is not of particular significance, and other stable mounting arrangements including different numbers of mounting points may be involved. It is understood that the payload may be the member causing the vibration and the base the member to be isolated in which case the vibration isolators need merely to be inverted (either through internal organization or physically). After so placing the vibration isolators, they are tuned to minimize the undesirable vibrations and the payload and base may thereafter perform their function.

Figure 2:
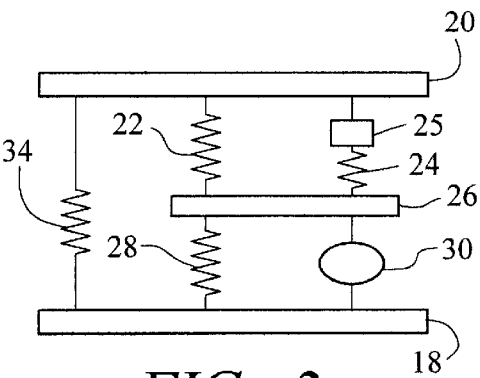
FIG. 2 is a schematic force representation of an active, a passive and shock isolation scheme.

In FIG. 2, the base 10 of FIG. 1, which will be considered as the vibrating member, is shown as a lower flat member 18 and the payload 12 of FIG. 1, which will be considered the quiet member to be isolated from vibrations of the base 18 is shown as an upper flat member 20. A passive isolator which may be a "folded D strut" like that shown in the above mentioned L. P. Davis U.S. Pat. No. 5,219,051 is shown schematically as a spring 22 in parallel with a spring 24 and damper 25 to form a three-parameter passive isolation stage that connects the payload 20 and a floating member shown as a flat plate 26. An active isolator shown as a spring 28 in parallel with an active force producing member 30 which may be a magneto restrictive device or preferably a piezoelectric stack is shown connected between base member 18 and the floating 26. Finally, the shock or launch protection mechanism such as a SMA flexure is shown schematically as a spring 34 connected between the base 18 and the payload 20. In operation, the arrangement of FIG. 2 allows for both high frequency and low frequency damping with launch shock protection.

Figure 3:
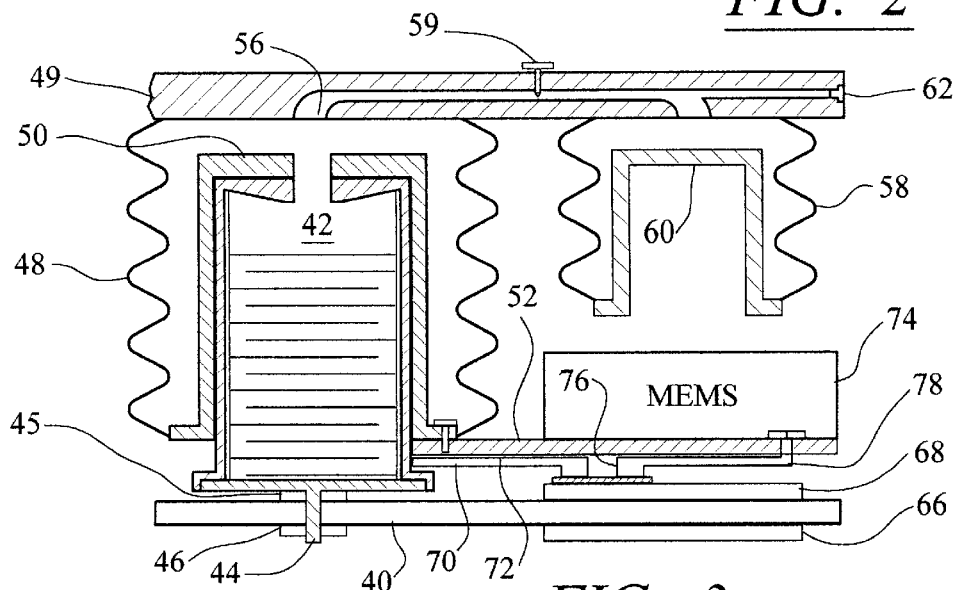
FIG. 3 is a cross-sectional view of a preferred embodiment of an active and passive isolation scheme.

Referring to FIG. 3, a cross-sectional view of an active and passive isolator is shown. In FIG. 3, the base member is shown as a flat plate 40 fastened to a piezoelectric stack 42 by a bolt 44, a spacer 45 and a nut 46. Other forms of attachment may, of course be used. A first bellows 48 mounted on an upper plate 49, extends down around a casing 50 which surrounds the piezoelectric stack 42 and is connected to a floating member or plate which is movable, up and down, with the bellows 48, casing 50 and the piezoelectric stack 42 in order to keep vibration from being transmitted from the base 40 to the upper plate 49. Upper plate 49 has a fluid passage 56 therein which communicates with the interior of bellows 48. A set screw 59 is shown for use in carrying the size of the passage 56 to alter the damping characteristics at the folded D strut. A secondary bellows 58 is shown connected to plate 49 and its interior is also connected by passage 56 to the interior of bellows 48. The other end of bellows 58 is attached to a cup shaped member 60. The interiors of bellows 48 and 58 are filled with fluid by way of a port 62 in plate 49.

Base plate 40 is equipped with electronic circuitry shown as circuit boards 66 and 68 which are electrically connected to the piezoelectric stack 42 by conductors such as wires 70 and 72.

A motion sensing device, Micro Electro-Mechanical System (MEMS), such as an accelerometer 74, is shown mounted on the floating plate 52 and is electrically connected to circuit boards 66 and 68 by conductors such as wires 76 and 78.

The arrangement including bellows 48 and 58 is the "folded D-strut" apparatus described in the above mentioned Davis U.S. Pat. No. 5,219,051. The launch protection mechanism 34 of FIG. 2 is not shown in FIG. 3.

Figure 4:
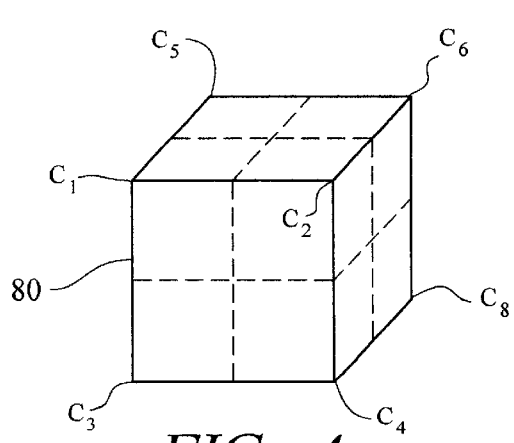
FIG. 4 is a showing of the cubical form of the vibration isolator of the present invention.
Figure 5:
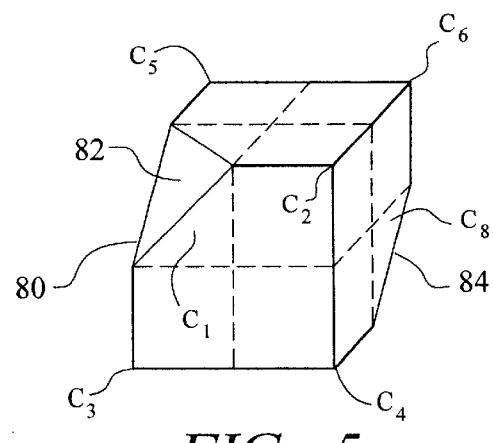
FIG. 5 is a showing of the alterations used on the cubical form of FIG. 4.

As mentioned, the active and passive isolators are preferably formed as a cube with opposite corners modified for use in mounting the cube to the members to be isolated. FIG. 4 shows a cube 80 with eight corners $c_1$, $c_2$, $c_3$, $c_4$, $c_5$, $c_6$, $c_7$ and $c_8$ ($c_7$ is not visible in FIG. 4). FIG. 5 shows the cube 80 of FIG. 4 with opposite corners, $c_1$ and $c_8$, cut off to provide mounting surfaces 82 and 84 as will be described in connection with FIG. 6.

Figure 6:
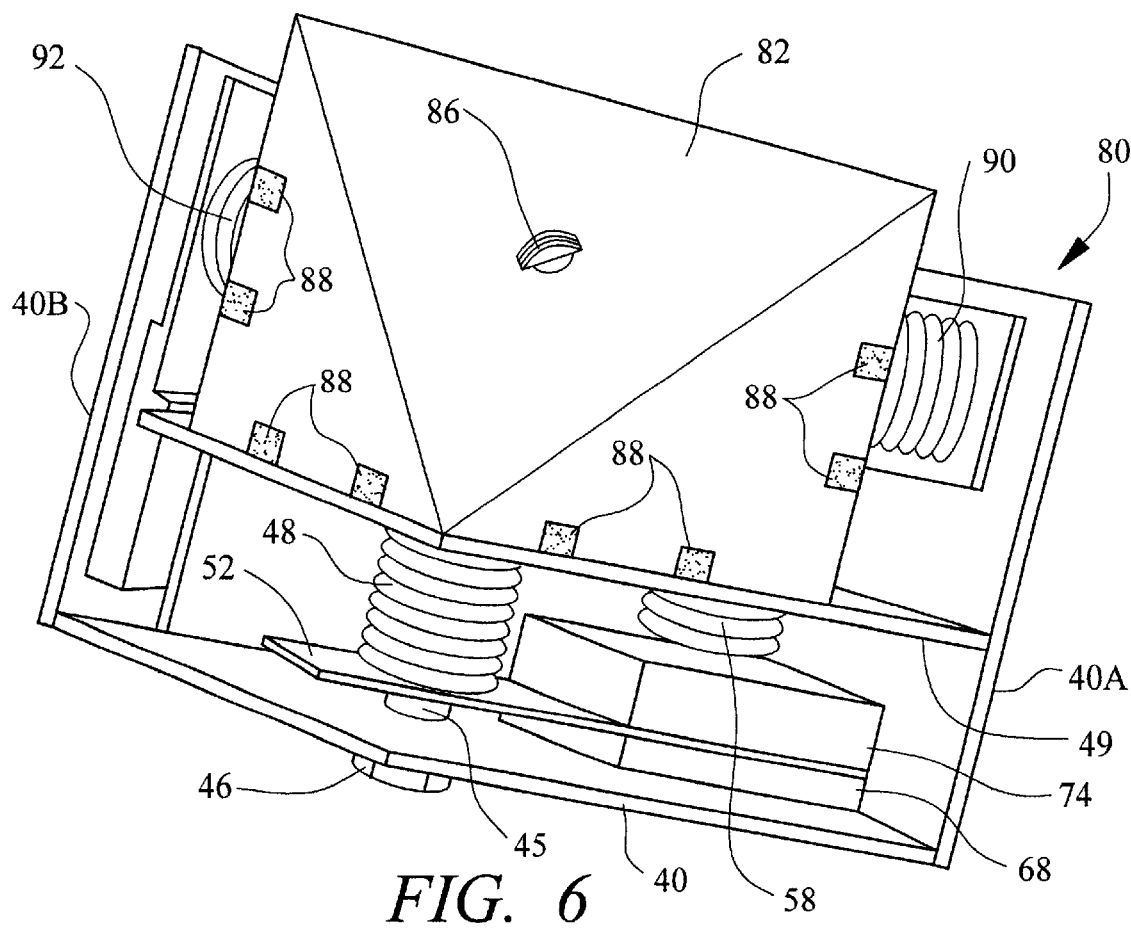
FIG. 6 is a perspective view of the preferred embodiment of the present invention.

In FIG. 6, elements common to FIGS. 3, 4 and 5 will carry the same reference numerals. In FIG. 6, the cutoff mounting surface 82 of corner $c_1$ in FIG. 5 is shown having a mounting hole 86 which is threaded for use in attaching the cube 80 to one of the members to be isolated. Surface 84 of corner $c_8$ in FIG. 5, is not visible in FIG. 6 but will be similarly attachable to the other of the two members to be isolated. The lower plate 40 of FIG. 3 is shown forming one of the housing walls around cube 80. Two other housing walls 40A and 40B are also shown but the other three housing walls have been removed to expose the interior. As with the lower plate 40, housing walls 40A and 40B are the lower plates for their respective vibration isolator units and comprise the vibrating member which produces vibration in 3 mutually perpendicular axes in the present example. Surface 82 passes through the housing walls (not shown) and is not attached thereto. The upper plate 49 of FIG. 3 is shown bering against the cutoff corner $c_1$ of cube 80. A number of SMA members shown as squares 88, which represent the same feature as the parallel spring 34 in FIG. 2, are mounted between the cube housing walls (not shown) and the cut corner $c_1$ during launch and will deform to absorb the shock of launch. After deformation they are removed or withdrawn so that corner $c_1$ is thereafter free to move with plate 49. The folded D-strut comprising bellows 48 and 58 are shown connected to plate 49 and attached to floating plate 52. Plate 52 carries the accelerometer 74. The bottom plate 40 which is in contact with the vibrating member in the present example by way of the housing walls 40A, 40B and the surface 84 of cutoff corner $c_8$, (not seen in FIG. 6), carries the electronic circuitry 68. The circuitry 66 of FIG. 3 is not visible in FIG. 6 but lies under bottom plate 40. In some cases, the bottom plate 40 (and the housing walls 40A and 40B) may have the electronic circuitry printed directly thereon. The piezoelectric stack 42 of FIG. 3 is inserted within the bellows 48 to save space and is not visible in FIG. 6, but the mounting spacer 45 and the nut 46 connecting it to the bottom plate 40 are seen.

Protection for other axes is provided by similar isolation devices including folded D-struts, shown partly by bellows 90 and 92 mounted between housing walls 40A and 40B and corner $c_1$ along axes perpendicular to the mounting of bellows 48. As such, protection for vibration in all axes is provided by the structure of FIG. 6.

Figure 7:
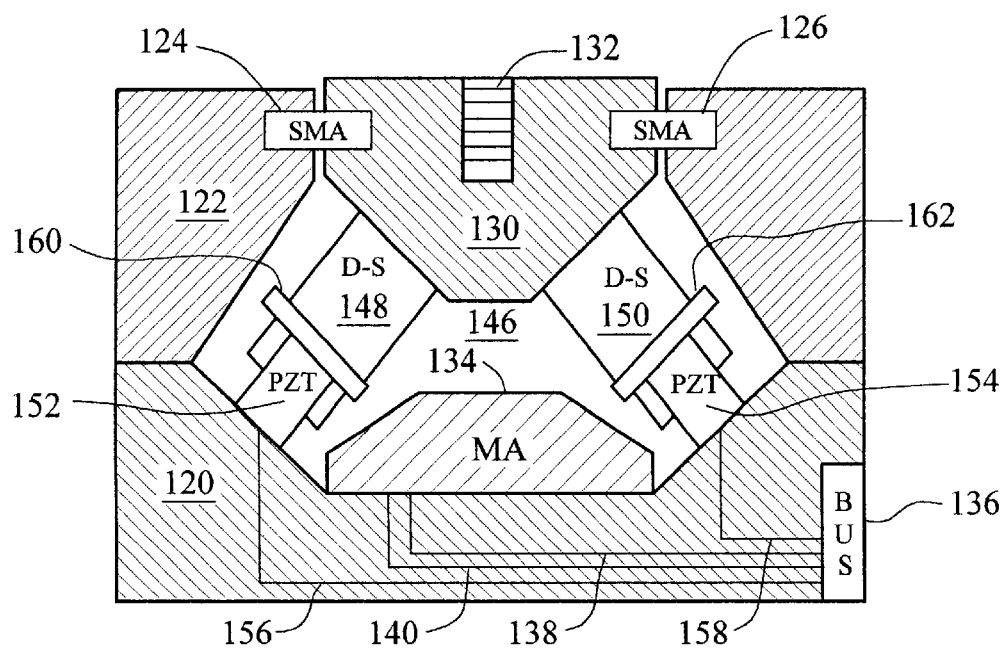
FIG. 7 is a cross-sectional view of an alternate embodiment of the present invention.

FIG. 7 shows a cross-section of an alternate embodiment which can perform the same functions as the apparatus of FIG. 6. In FIG. 7, a first or lower member 120, adapted to be mounted to the base 10 of FIG. 1, is shown. A second or upper member, 122, is removably fastened to lower member 120 such as by bolts (not shown). Mounted by launch protection devices or SMAs 124 and 126, to protect the payload 12 during launch, is a movable member, 130, having a threaded mounting hole 132 adapted to accept the mounting bolts (not shown) which previously fastened the payload 12 to the base 10 in FIG. 1. Once in orbit, the SMAs 124 and 126 will be pulled out by a small electric current via the inherent phase transformation of the material to allow the vibration isolators to work.

Attached to lower member 120 is a box 134 containing microelectronics for use in programming and system checkout and is the equivalent of the PC boards 66 and 68 of FIG. 3. A bus 136, built into the lower member 120, is connected to the microelectronics 134 by conductors shown as lines 138 and 140. The interior of the combination of lower member 120, upper member 122 and movable member 130 is formed to provide a shaped cavity 146 which is dimensioned to house vibration isolating elements comprising a pair of folded D-Struts 148 and 150, similar to those described above. A pair of piezoelectric stacks 152 and 154 is shown positioned within the primary bellows of D-struts 148 and 150. Piezoelectric stacks 152 and 154 are connected to bus 136 by conductors 156 and 158. Conductors 138, 140, 156 and 158 provide the access for the input and the output from the bus 36 to the microelectronics and the piezoelectric stacks for programming and system checkout. The accelerometers like MEMS 74 in FIGS. 3 and 4 are shown in FIG. 7 by blocks 160 and 162 connected to the D Struts 148 and 150 respectively. The structure of FIG. 7 is a two-axis structure (unlike the 3-axis structure of FIG. 6) but, if desired, 3 units in a tripod fashion may be used and the third unit (not shown) would be located behind the two shown. The structure of FIG. 7 provides the same protection as the structure of FIG. 6 but is somewhat less adaptable to be formed in a convenient cube shape. Three or more vibration isolators such as shown in FIG. 7 will be employed between the vibrating member and the member to be isolated and when two axis isolators are used, the mounting arrangements of the other isolators will be so as to provide vibration isolation in all three axes of vibration. The passive D-Strut stage can be tuned by a set screw (not shown) which varies the orifice size between the bellows 48 and 58 and hence the damping center frequency of the unit.

If the vibration isolator were to be used for a situation, such as submarine decking, where the vibration comes from the payload, the above described architecture would be changed so that the passive and active stages were reversed and the active stage would have to be increased in force capability to handle larger loads of a submarine deck. Also, the SMA launch protection devices 124 and 126 may not be removed during operation and instead may be used as an additional spring. The size of the vibration isolator might also have to increase to about a six inch, rather than a one-inch, cube.

It will be seen that the architectures of FIGS. 6 and 7 provide for easy mounting between a payload 12 and a base 10 in FIG. 1, or vice versa, and the structure is rugged and well adapted to provide retrofit vibration isolation. Many changes will occur to those having skill in the art and we do not wish to be limited by the specific embodiments used in connection with the description of the preferred embodiments.

What is claimed is:

1. A modular retrofittable vibration isolator for insertion between a first member which may vibrate and a second member which is to be isolated from vibrations comprising:
    an active vibration isolator having a first portion connected to the first member and a second portion connected to an additional member;
    a passive vibration isolator having a first portion connected to the second member and second portion connected to the additional member, said active vibration isolator providing low frequency isolation between the first and second members and said passive vibration isolator providing high frequency isolation between the first and second members; and
    a generally box-shaped structure with two diagonally opposite corners cut-off to form first and second surfaces, said box shaped structure housing the active unit and the passive unit with at least a portion of the first surface connected to the first member and at least a portion of the second surface integrally connected to the second member.

2. Apparatus according to claim 1 further including a shock isolator mounted between the first and second members, said shock isolator comprising a deformable material.

3. Apparatus according to claim 1 wherein the active unit comprises a piezoelectric transducer.

4. Apparatus according to claim 1 wherein the passive unit comprises a first variable volume fluid filled chamber having a first portion connected to the second member and second portion connected to the additional member and a second variable fluid filled chamber in a fluid connection with the first.

5. Apparatus according to claim 4 wherein the active unit comprises a piezoelectric transducer.

6. Apparatus according to claim 1 wherein at least a portion of the first member is the first surface and at least a portion of the second member is the second surface.

7. Apparatus according to claim 6 further including mounting means connected to the first and second members for attachment to a base and a payload to be vibration isolated.

8. Apparatus according to claim 1 further including second and third active vibration isolators each having a first portion connected to the first member and a second portion connected to second and third additional members, respectively, and second and third passive vibration isolators each having a first portion connected to the second member and a second portion connected to the second and third additional members, respectively.

9. Apparatus according to claim 8, wherein the three active vibration isolators and the three passive vibration isolators operate in three mutually perpendicular directions.

10. Apparatus according to claim 9 further including second and third modular retrofittable vibration isolators for connection between the first and second members.

11. A vibration isolator for use between a vibrating member and a member to be isolated comprising:
    a first structure having a first and second surface, the first surface adapted for attachment to the vibrating member and the first structure having an interior chamber extending through the second surface to form an aperture therein;
    a movable member constructed to fit within the aperture of the second surface for movement into and out of the chamber, said movable member having a fastener for attachment to the member to be isolated;
    an active vibration isolator in said cavity and having first and second ends, the first end of said active vibration isolator being attached to the first structure; and
    a passive vibration isolator in said cavity and having first and second ends, the first end of said passive vibration isolator being attached to the second end of said active vibration isolator and the second end of said passive vibration isolator being attached to said movable member, the passive isolator comprising a first variable volume fluid filled chamber having a first portion connected to the vibrating member and a second portion connected to a member to be isolated and a second variable fluid filled chamber in a fluid connection with the first chamber.

12. A vibration isolator of claim 11 further including a shock vibration isolator removably connected between the movable member and the first structure.

13. A vibration isolator of claim 12 where the shock vibration isolator comprises a deformable material.

14. A vibration isolator of claim 11, wherein the active vibration isolator includes a motion-producing device.

15. A vibration isolator of claim 14 where the active element is a piezoelectric stack.

16. A vibration isolator of claim 14 further including a motion sensor.

17. A vibration isolator of claim 16 wherein the motion sensor is MEMS based.

18. A vibration sensor of claim 14 where the active element is a magnetostrictive actuator.

19. A vibration isolator of claim 11 wherein the passive vibration isoloator includes an adjustable orifice to modify fluid flow between the first and second fluid chambers to modify the frequency response of the isolator.

* * * * *